United States Patent
Ikegaya et al.

(10) Patent No.: US 10,688,704 B2
(45) Date of Patent: Jun. 23, 2020

(54) MOLD CLAMPING DEVICE AND METHOD

(71) Applicant: THE JAPAN STEEL WORKS, LTD., Tokyo (JP)

(72) Inventors: Masanosuke Ikegaya, Kanagawa (JP); Yukio Fujiwara, Kanagawa (JP); Kazunari Suzuki, Kanagawa (JP); Toshimitsu Okuoka, Kanagawa (JP)

(73) Assignee: The Japan Steel Works, Ltd., Tokyo (JP)

( * ) Notice: Subject to any disclaimer, the term of this patent is extended or adjusted under 35 U.S.C. 154(b) by 148 days.

(21) Appl. No.: 16/070,906

(22) PCT Filed: Dec. 26, 2016

(86) PCT No.: PCT/JP2016/088713
§ 371 (c)(1),
(2) Date: Jul. 18, 2018

(87) PCT Pub. No.: WO2017/126298
PCT Pub. Date: Jul. 27, 2017

(65) Prior Publication Data
US 2019/0022910 A1    Jan. 24, 2019

(30) Foreign Application Priority Data
Jan. 19, 2016  (JP) ................................. 2016-007808

(51) Int. Cl.
*B29C 45/80*    (2006.01)
*B29C 49/20*    (2006.01)
(Continued)

(52) U.S. Cl.
CPC .............. *B29C 45/80* (2013.01); *B29C 49/56* (2013.01); *B29C 49/04* (2013.01); *B29C 49/20* (2013.01);
(Continued)

(58) Field of Classification Search
CPC . B29C 45/80; B29C 49/56; B29C 2049/2013; B29C 2049/4807;
(Continued)

(56) References Cited

U.S. PATENT DOCUMENTS

| | | | | |
|---|---|---|---|---|
| 4,846,654 A | * | 7/1989 | Neko | ...................... B29C 45/80 425/150 |
| 2012/0034330 A1 | * | 2/2012 | Fujita | ...................... B29C 45/66 425/4 R |

FOREIGN PATENT DOCUMENTS

| | | |
|---|---|---|
| CN | 101888921 | 11/2010 |
| WO | 2009/118833 | 10/2009 |

OTHER PUBLICATIONS

Office Action dated Sep. 6, 2019 in Chinese Application No. 201680079395.6, with English translation.

* cited by examiner

*Primary Examiner* — Nahida Sultana
(74) *Attorney, Agent, or Firm* — Wenderoth, Lind & Ponack, L.L.P.

(57) ABSTRACT

Moving servo motors of molds in synchronization with the operations of platens which enables fine patterns or shapes to be formed even on a large molded article. A mold clamping device forms patterns or the like on a molded article by detecting a mold position of a second platen among first, second, third platens with digital mold opening/closing position detector, and driving servo motors for molds of the molds in synchronization with a digital mold opening/closing position signal from the digital mold opening/closing position detector.

10 Claims, 12 Drawing Sheets

(51) Int. Cl.
  *B29C 49/56* (2006.01)
  *B29C 49/78* (2006.01)
  *B29C 49/04* (2006.01)
  *B29C 49/48* (2006.01)
(52) U.S. Cl.
  CPC ...... *B29C 49/78* (2013.01); *B29C 2049/2013* (2013.01); *B29C 2049/4807* (2013.01); *B29C 2049/563* (2013.01); *B29C 2049/566* (2013.01)
(58) Field of Classification Search
  CPC .............. B29C 49/04; B29C 2049/566; B29C 2049/563; B29C 49/20; B29C 49/78
  See application file for complete search history.

(MOLD CLAMPING STATE OF HYDRAULIC CONSTRUCTION OF TYPE IN WHICH ALL PLATENS ARE MOVABLE)

(BLOCK DIAGRAM OF THE PRESENT INVENTION IN WHICH EXISTING HYDRAULIC MOLD CLAMPING DEVICE IS MODIFIED)

(BLOCK DIAGRAM IN WHICH MOLD CLAMPING DEVICE ACCORDING TO THE PRESENT INVENTION IS CONFIGURED AS HYDRAULIC TYPE)

(MOLD CLOSING STATE)

(MOLD CLOSING STATE)

(MOLD OPENING STATE OF CONVENTIONAL MOLD CLAMPING DEVICE)

(MOLD CLAMPING STATE OF CONVENTIONAL MOLD CLAMPING )DEVICE (MOLD OPENING/CLOSING POSITION CONTROL)

(CONVENTIONAL ELECTRIC MOLD CLAMPING DEVICE)

(MOLD OPENING/CLOSING POSITION CONTROL)

(CONVENTIONAL HYDRAULIC MOLD CLAMPING DEVICE)

MOLD CLAMPING DEVICE AND METHOD

TECHNICAL FIELD

This invention relates to a mold clamping device and a mold clamping method and, in particular, to a novel improvement by which a digital mold opening/closing position detection signal from digital mold opening/closing position detection means is used to enable a servo motor provided in a mold or the like to operate in synchronization with the digital mold opening/closing position signal.

BACKGROUND ART

Conventionally, as a mold clamping device and a mold clamping method of this type, there has been a ship-in molding device of a blow molding machine in which a component inserted into a molded article is fixed with a supporting rod, and then a parison is put on the component and mold clamping is performed from the outside of the parison as shown in, for example, Patent Document 1.

During the mold clamping described above, the movements of molds and the movement of a motor that supports a member inserted into a cavity are synchronized with each other. Although some constructions control the pressurization force of molds to make a film thickness uniform like the one shown in Patent Document 1, they do not synchronize positions.

Here, a description will be given of the outline of the device shown in Patent Document 1 described above together with its graphical representation.

In FIG. 11, reference signs 11, 11A show a pair of molds that forms a cuboid-like cavity. Pressing portions 31 are provided at the centers of the inner faces of the molds 11, 11A to be made slidable with respect to the molds by driving means 32 such as cylinders.

Reference sign 33 shows a parison made of thermoplastic resin serving as the raw material of a tank body. The parison is extruded from an extrusion molding machine after being heated to a predetermined temperature. Reference sign 35 shows a baffle plate made of resin in a rectangular shape placed within the tank body (not shown). The baffle plate 35 is horizontally supported at the tip end of a supporting rod 36 that does not have the function of a blow pin (i.e., is not cylindrical), and its both ends are arranged to face the pressing portions 31 of both of the molds 11, 11A, respectively.

In FIG. 12, reference sign 37 shows a blow pin arranged through one of the molds 11, 11A. The blow pin 37 is of a type that blows air by blowing means 38 of a cylinder, and its diameter is the same as the outer diameter of a hole (not shown) for an air breather formed on an upper face of the tank body (not shown).

As shown in FIG. 12, after the parison 33 is drawn down between the released molds 11, 11A to be fitted onto the baffle plate 35, the pressing portions 31 are first moved forward by the driving means 32 to press the facing lateral wall of the parison 33 and fix the ends of the baffle plate 35 to the inner face of the parison 33 by welding. At this time, the pressing force of the pressing portions 31 can be arbitrarily adjusted by the driving means 32. Then, the supporting rod 36 is removed from the molds 11, 11A after the completion of the welding.

Subsequently, as shown in FIG. 13, both of the molds 11, 11A are clamped to seal the upper and lower ends of the parison 33. At this time, the tip end of the blow pin 37 penetrates the lateral wall of the parison 33 to enter the inside of the parison 33. Then, compressed air is blown into the parison 33 from the tip end of the blow pin 37 to expand the parison 33 to closely adhere to the inner faces of the molds 11, 11A. Thus, a hollow body can be molded.

When molds are clamped as described above, an electric mold clamping device and a hydraulic mold clamping device are generally available as mold clamping devices for a blow molding machine.

The electric mold clamping device of a blow molding machine includes an opening/closing position detection mechanism and a synchronization device characterized by a mechanism that controls mold opening/closing positions by a main motor for driving molds and the operations of the servo motors of sub-motors in the molds and other places to enable the synchronization between mold opening/closing operations and the operations of the servo motors in the molds and other places.

Although some constructions control the pressurization force of molds to make a film thickness uniform like the construction shown in Patent Document 1, they do not synchronize positions.

As a conventional hydraulic mold clamping device described above, FIGS. 7 and 9 show a construction in which all platens 5 to 7 move in synchronization with each other. FIG. 7 shows a mold opening state, and FIG. 8 shows a mold clamping state.

That is, in FIG. 7, reference sign 1 shows a base, and first, second, and third linear-motion guides 2, 3, 4 formed from rails or the like and separated and independent from each other are provided on the base 1.

First, second, and third platens 5, 6, 7 are provided on the first, second, and third linear-motion guides 2, 3, 4, respectively, to be capable of linearly moving.

The first and third platens 5, 7 are fastened by a plurality of (actually four) tie bars 8 and fixed by respective nuts 9.

The respective tie bars 8 penetrate through-holes 6a and 7a of the second and third platens 6, 7 in an operable manner, and the second and third platens 6, 7 are configured to freely contact and separate from each other.

A hydraulic cylinder 12 in which a protrusion element 12A is configured to freely move in/out by a hydraulic unit 10 is provided on an inner surface 5a of the first platen 5.

The first and second molds 11, 11A are provided on inner surfaces 6A, 7A of the second and third platens 6, 7, respectively. An interlocking mechanism 15A based on a well-known rack-and-pinion in which L-shaped first and second levers 13, 14 and a gear 15 are combined together is provided beneath the second and third platens 6, 7.

An analog linear-motion detector 16 formed from a well-known linear scale or potentiometer for detecting the linear motion of the second platen 6 is provided on the base 1.

Note that the structures of the molds 11, 11A described above are not shown but are configured like, for example, the conventional example of FIGS. 11 and 12.

When the hydraulic cylinder 12 is operated via the hydraulic unit 10 in the mold opening state of FIG. 7 under the construction described above, the third movable platen 7 is pulled to the side of the second platen 6 via the interlocking mechanism 15A to bring the molds 11, 11A into press contact with each other to achieve mold clamping as the protrusion element 12A presses the second platen 6 to a right side in the figure.

The linear-motion state of the second platen 6 described above is detected as an analog value by the analog linear-motion detector 16.

CONVENTIONAL ART DOCUMENTS

Patent Document

[Patent Document 1] Japanese Patent Application Publication No. 6-143396

SUMMARY OF INVENTION

Problems to be Solved by the Invention

Since a conventional mold clamping device and a conventional mold clamping method are configured as described above, the following problems arise.

For example, in a conventional electric mold clamping device shown in FIG. 9, the control board 20 controls the opening/closing of platens 5 and 6 (shown in FIG. 7) via a servomotor 21, an encoder 22, and a ball screw 23 such that platen position information 20a can be synchronized with servo motors 24 in the molds 11, 11A (FIG. 7) based on a rotation detection signal 22a from the encoder 22. However, since a mold clamping operation per se is an electric operation, although the servo motors can be synchronized with each other, this is not suitable for molding a large molded article having many patterns or the like because the motors are small and a mold clamping force is insufficient.

Further, in a conventional hydraulic mold clamping device shown in FIG. 10, portions same as those of FIG. 9 are shown by the same reference signs to be described.

The hydraulic mold clamping device is configured such that oil 10a is supplied from a hydraulic unit 10 to a hydraulic cylinder 12 to open/close the platens 5, 6, a linear scale or potentiometer 16 (FIG. 7) performs mold opening/closing position detection 25, and a mold opening/closing position signal 15Aa is input to a control board 20.

It is desired that platen position information 20a output from the control board 20 be input to servo motors 24 in the molds 11, 11A for synchronized driving.

However, in the hydraulic mold opening/closing operation of a hydraulic mold clamping device, the position of a second platen is detected by a linear scale or a potentiometer, and mold opening/closing control is performed by using a hydraulic cylinder. Conventionally, if position information on platens measured by the linear scale or potentiometer is converted into a speed and the positions and speeds of servo motors in the molds during the opening/closing of the molds are to be synchronized, there is a difference in the communication speed between the analog mold opening/closing position signal 25a and the platen position information 20a in FIG. 10 due to a difference in the position information detection speed between the linear scale or potentiometer and the servo motors. Therefore, they cannot be synchronized with each other, which causes a deviation in the synchronization of the mold opening/closing operations between the linear scale or the potentiometer and the servo motors in the molds.

Due to a deviation in synchronization as described above, in a hydraulic mold clamping device of a blow molding machine there is no opening/closing position detection mechanism and synchronization device that control mold opening/closing positions and the operations of servo motors in molds and other places to enable the synchronization between the opening/closing of the molds and the operations of the servo motors in the molds and other places with high accuracy. Therefore, it is really difficult to improve the finishing accuracy of a large molded article having complicated irregularities or the like under the conventional construction.

Further, in electric opening/closing operations, although an electric mold clamping device can control the opening/closing operations with servo motors, the electric mold clamping device cannot mold a large molded article with high accuracy since it is inferior in mold clamping force to a hydraulic mold clamping device using a hydraulic cylinder.

Therefore, a blow molding machine with an electric mold clamping device inferior in mold clamping force to a hydraulic mold clamping device can perform molding such as ship-in molding requiring fine movements. However, a blow molding machine with a hydraulic mold clamping device superior in mold clamping force to an electric mold clamping device has a difficulty in performing molding such as ship-in molding requiring fine movements since it cannot control the fine movements of molds with high accuracy.

This invention has been made in order to solve the above problems in the conventional technologies and has an object of providing, in particular, a mold clamping device and a mold clamping method in which a digital mold opening/closing position signal from digital mold opening/closing position detection means is used instead of a linear scale or potentiometer for mold opening/closing operations and servo motors in the molds or other places are operated based on the detection of positions and information on the positions in a hydraulic mold clamping mechanism to enable the synchronous operation between the opening/closing of the molds and the servo motors in the molds or other places.

Means for Solving the Problems

According to this invention, a mold clamping device that moves, with an actuator, at least a second platen among first, second, and third platens provided on a base via a tie bar, and closes and opens first and second molds provided on the second and third platens, respectively, includes: servo motor (s) for the molds provided in at least one or both of the respective molds; and digital mold opening/closing position detection means provided on the base and detecting a mold position of the second platen, wherein one or both of the servo motors for the first and second molds are configured to be driven in synchronization with a digital mold opening/closing position signal from the digital mold opening/closing position detection means. Further, the first and third platens are configured to move with the second platen. Further, the mold clamping device according to any one of Claims 1, 2, and 3 is configured to be combined with a blow molding machine. Further, the digital mold opening/closing position detection means is configured to be formed from a servo motor with a rotation detector, and a ball screw.

The digital mold opening/closing position detection means is configured to be formed from a combination of any of an encoder, a resolver and a magnetic encoder, and a rack-and-pinion. Further, according to this invention, a mold clamping method that closes and opens first and second molds provided at least on a second platen among first, second, and third platens provided on a base via a tie bar includes: using servo motor(s) for the molds provided in at least one or both of the respective molds and digital mold opening/closing position detection means provided on the base and detecting a mold position of the second platen; and driving one or both of the servo motors for the first and second molds in synchronization with a digital mold opening/closing position signal from the digital mold opening/ closing position detection means. Further, in the mold clamping method, the first and third platens move with the second platen. Further, the mold clamping method according to any one of Claims 6, 7, and 8 is combined with a blow molding machine. Further, in the mold clamping method, the digital mold opening/closing position detection means is formed from a servo motor with a rotation detector, and a ball screw.

In the mold clamping method, the digital mold opening/closing position detection means is formed from a combination of any of an encoder, a resolver and a magnetic encoder, and a rack-and-pinion.

Effect of the Invention

Since a mold clamping device and a mold clamping method according to this invention are configured as described above, the following effects can be obtained.

That is, a mold clamping device that moves, with an actuator, at least a second platen among first, second, and third platens provided on a base via a tie bar, and closes and opens first and second molds provided on the second and third platens, respectively, includes: servo motor(s) for the molds provided in at least one or both of the molds; digital mold opening/closing position detection means provided on the base and detecting a mold position of the second platen; and the digital mold opening/closing position detection means, wherein one or both of the servo motors for the first and second molds are configured to be driven in synchronization with a digital mold opening/closing position signal from the digital mold opening/closing position detection means. Thus, the mold clamping device has both the advantages of a hydraulic type and an electric type, i.e. the mold clamping device can mold a large molded article with high accuracy that has not been capable of being molded by the electric mold clamping device of a blow molding machine using servo motors as power due to its insufficient mold clamping force, and can respond also to complicated and fine movements that have not been capable of being achieved by the hydraulic mold clamping device of a blow molding machine due to the impossibility of synchronization. As a result, the mold clamping device can obtain a large, complicated, and fine molded article.

Further, this invention can be utilized not only in assembling a new mold clamping device of a blow molding machine but also in additionally modifying an existing hydraulic mold clamping device that has been already installed. Therefore, subsequently-required investment costs can be reduced compared with a case in which the existing hydraulic molding clamping device is replaced by an electric mold clamping device.

Further, the first and third platens are configured to move with the second platen, and can therefore be applied to various mold clamping devices.

The digital mold opening/closing position detection means is formed from a servo motor with a rotation detector, and a ball screw. Therefore, the digital mold opening/closing position detection means having an extremely simple construction can be obtained.

Further, the digital mold opening/closing position detection means is formed from a combination of any of an encoder, a resolver and a magnetic encoder, and a rack-and-pinion. Therefore, a required digital mold opening/closing position signal can be easily obtained.

EMBODIMENTS OF THE INVENTION

A mold clamping device and a mold clamping method according to this invention use a digital mold opening/closing position signal from digital mold opening/closing position detection means during mold clamping to enable servomotors provided in molds or the like to operate in synchronization with the digital mold opening/closing position signal.

Embodiment

Hereinafter, a description will be given of preferred embodiments of a mold clamping device and a mold clamping method according to this invention with reference to the drawings.

Note that portions the same as or equivalent to those of a conventional example will be shown by the same reference signs to be described, portions same as those of FIGS. 7 to 13 representing a conventional example will be shown by the same reference signs and their descriptions will be incorporated and omitted in order to avoid duplication, and only different portions will be described.

A description will be given of portions different from the conventional construction (FIGS. 7 and 8) described above in the mold clamping device of FIG. 1 and FIG. 2 according to this invention. Note that in the construction of FIGS. 1 and 2, platens 5, 6, and 7 are movable like the construction of FIGS. 7 and 8.

Figure 1:
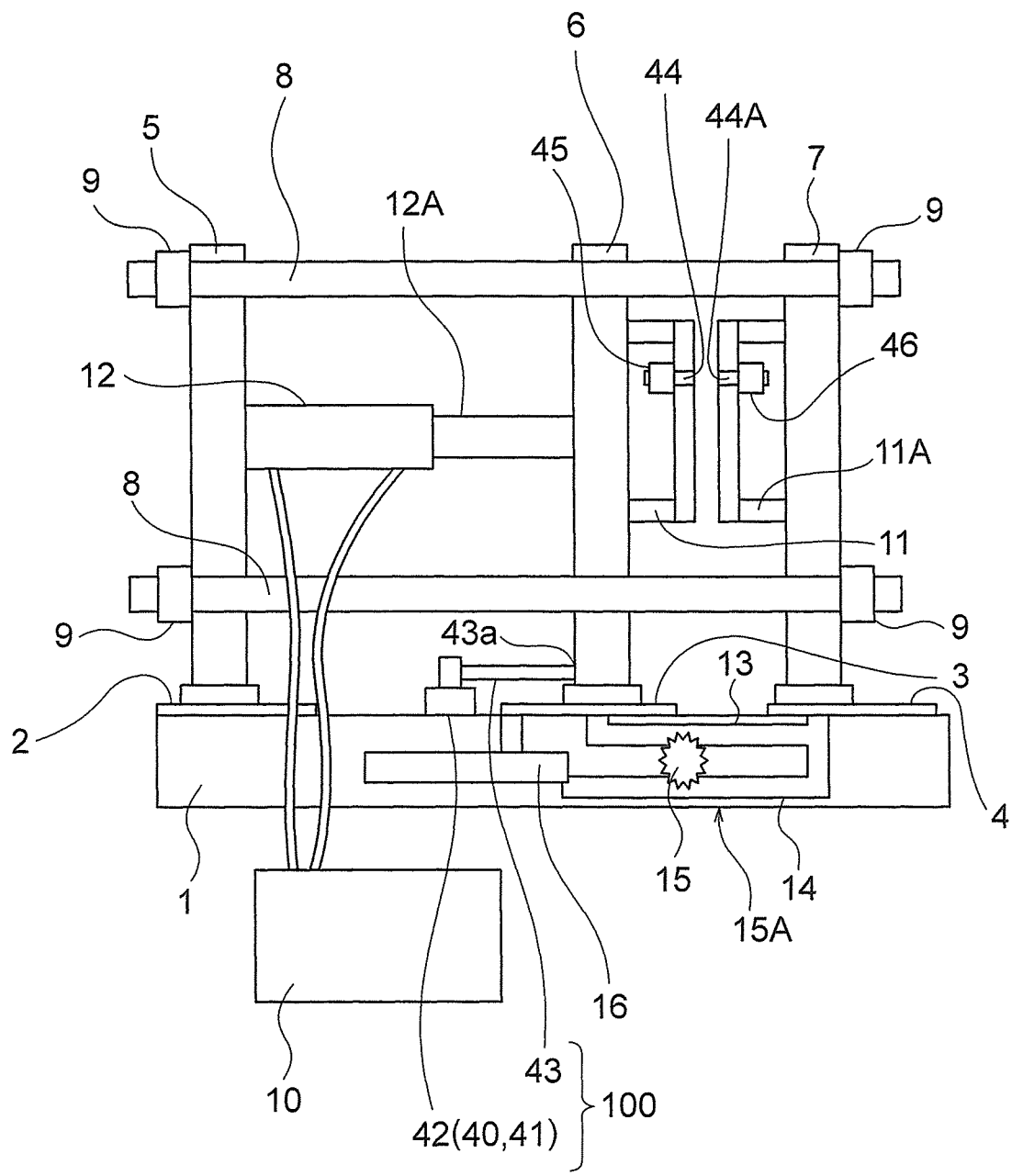
FIG. 1 is a schematic construction diagram showing a mold clamping device and a mold clamping method according to this invention.

In FIG. 1, a servo motor 42 with a rotation detector in which a rotation detector 40 such as an encoder and a servo motor 41 are integrated with each other is provided on a base 1. A tip end 43*a* of a ball screw 43 provided in the servo motor 42 with the rotation detector abuts with the second movable platen 6.

A bearing (not shown) is provided at the tip end 43a of the ball screw 43, and the tip end 43a is configured to be rotatable while abutting with the second movable platen 6.

Figure 3:
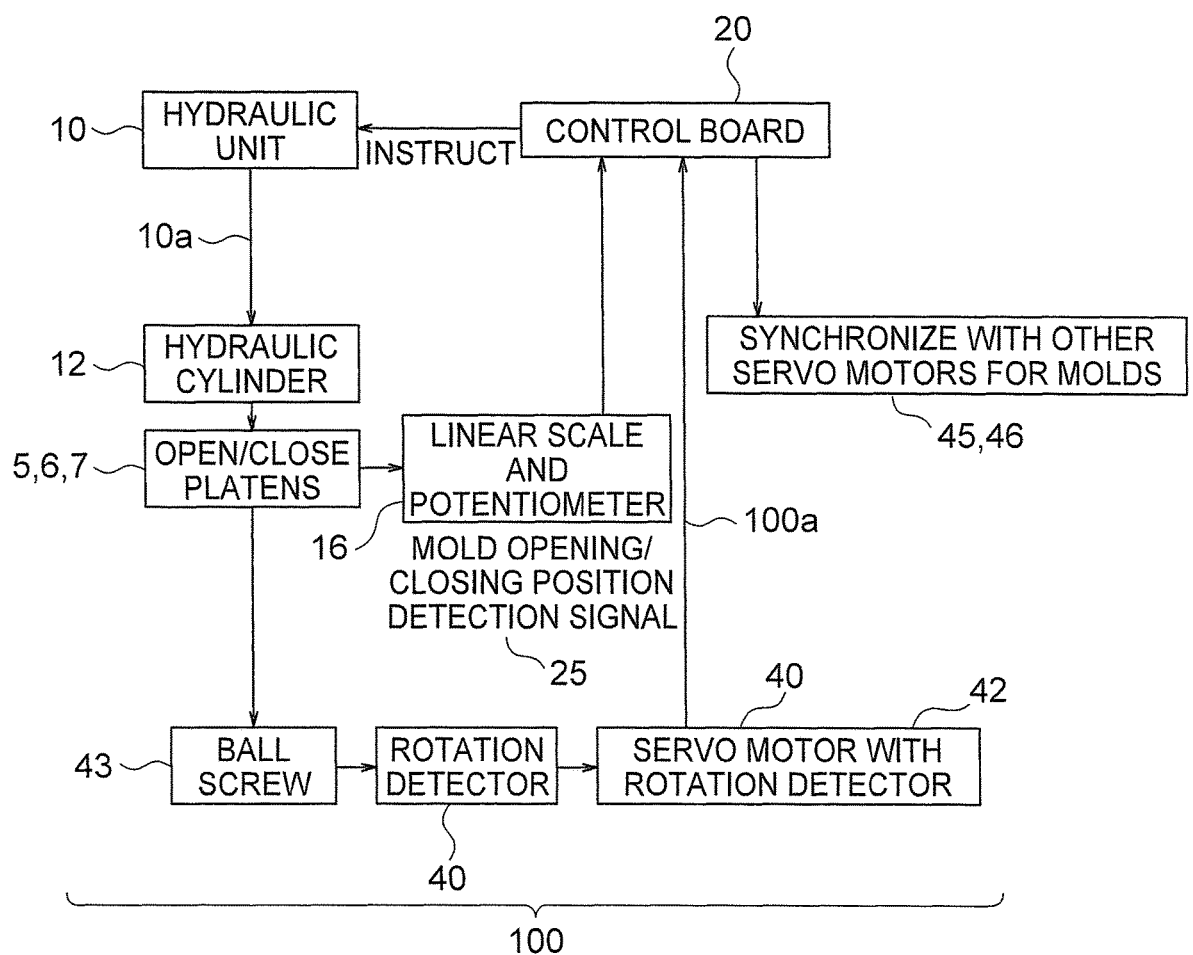
FIG. 3 is a block diagram of a construction in which a conventional hydraulic mold clamping device is modified.

The servo motor 42 with the rotation detector and the ball screw 43 described above constitute digital mold opening/closing position detection means 100, and a digital mold opening/closing position detection signal 100a is configured to be output from the digital mold opening/closing position detection means 100 as shown in FIG. 3.

Generally, the rotation detector 40 of the servomotor 42 with the rotation detector uses a count value, which is obtained by counting the pulse-shaped rectangular wave of an encoder with a counter after shaping waveform thereof, as the digital mold opening/closing position detection signal 100a. Therefore, the communication speed thereof is faster than the output signal of a conventional linear scale or potentiometer.

Further, the digital mold opening/closing position detection means 100 is not limited to the combination with the ball screw 43 described above. If the ball screw 43 is replaced by a rod-shaped rack (not shown) and any of an encoder, a resolver, and a magnetic encoder is connected to a pinion provided in the rack (i.e. a well-known rack-and-pinion), the same functions and effects as those of the construction using the ball screw 43 described above can be obtained.

That is, the resolver described above is configured to be extremely stable as a rotation detector, capable of obtaining a two-phase output even under unfavorable conditions, and capable of obtaining the digital mold opening/closing position detection signal 100a having faster communication speed by an A/D convertor, and is used in, for example, detecting the rotation of a hybrid vehicle.

Further, the magnetic encoder can also output a pulse-shaped rectangular wave as a count value and is used in, for example, detecting the speed of a Japanese bullet train.

Figure 11:
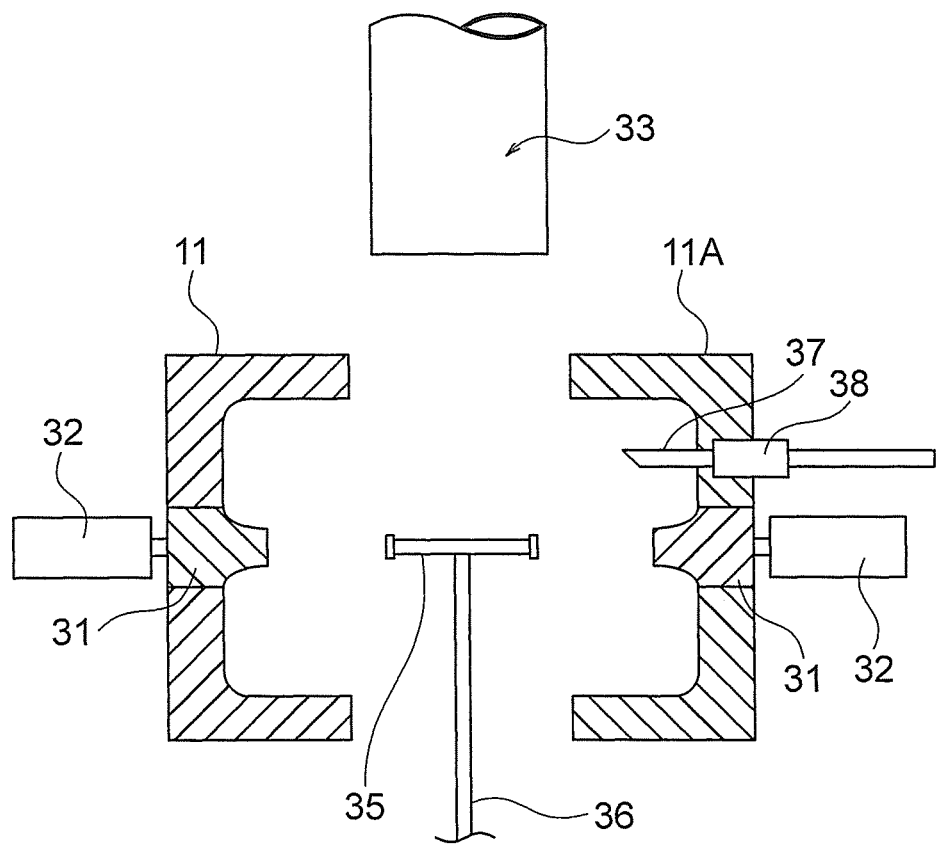
FIG. 11 is a schematic cross-sectional construction diagram showing the essential portions of a conventional blow molding machine.
Figure 12:
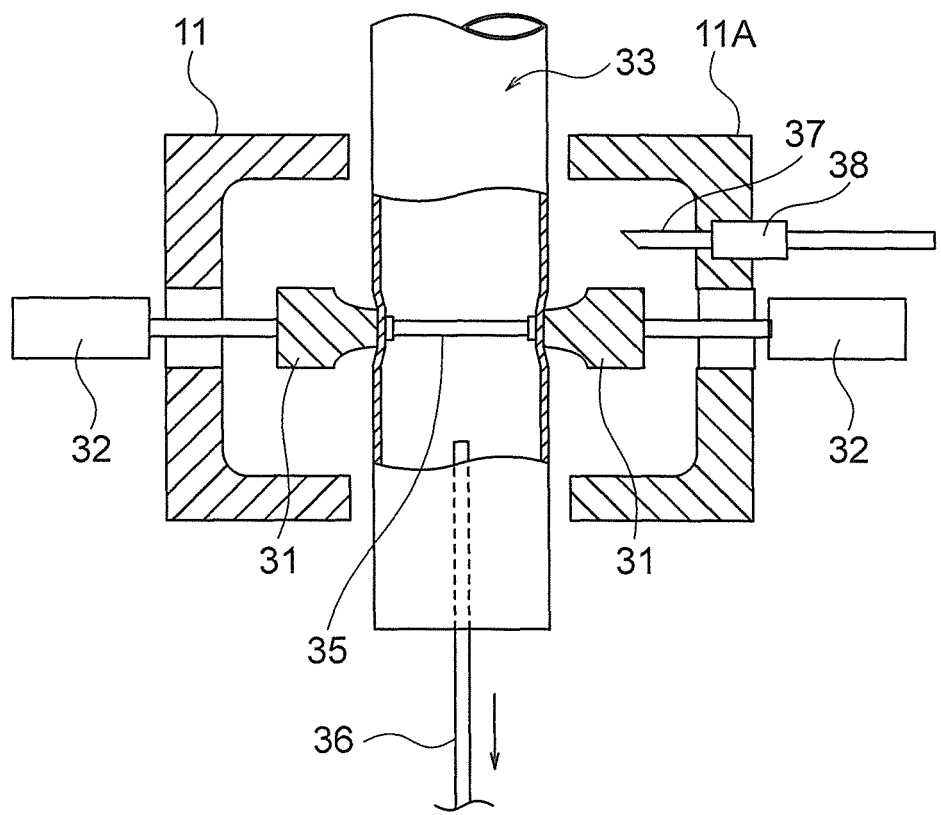
FIG. 12 is a schematic cross-sectional construction diagram showing the state of starting the mold clamping in FIG. 11.
Figure 13:
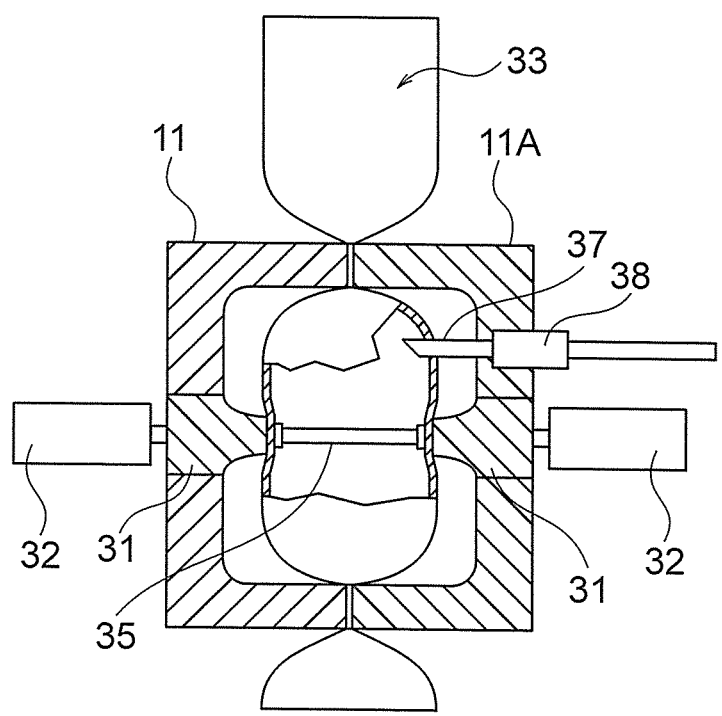
FIG. 13 is a cross-sectional diagram showing the state of completing the mold clamping and the state of injecting air in FIG. 12.

Servo motors 45, 46 for first and second molds having first and second movable elements 44, 44A, respectively, are provided in first and second molds 11, 11A described above, respectively, and configured to be used to form irregularities, patterns, or the like on the shape of a parison 33 during molding like respective movable elements 31 described in FIGS. 11 to 13 representing a conventional construction.

The construction of FIG. 1 shows a state in which the respective molds 11, 11A are being clamped with a protrusion element 11 of an actuator 12 protruded. In this case, however, the respective movable elements 44 and 44A are not protruded from the molds 11, 11A, respectively. Therefore, a parison (not shown) sandwiched between the molds 11, 11A is molded into the shape of the cavity of the molds 11, 11A.

Figure 2:
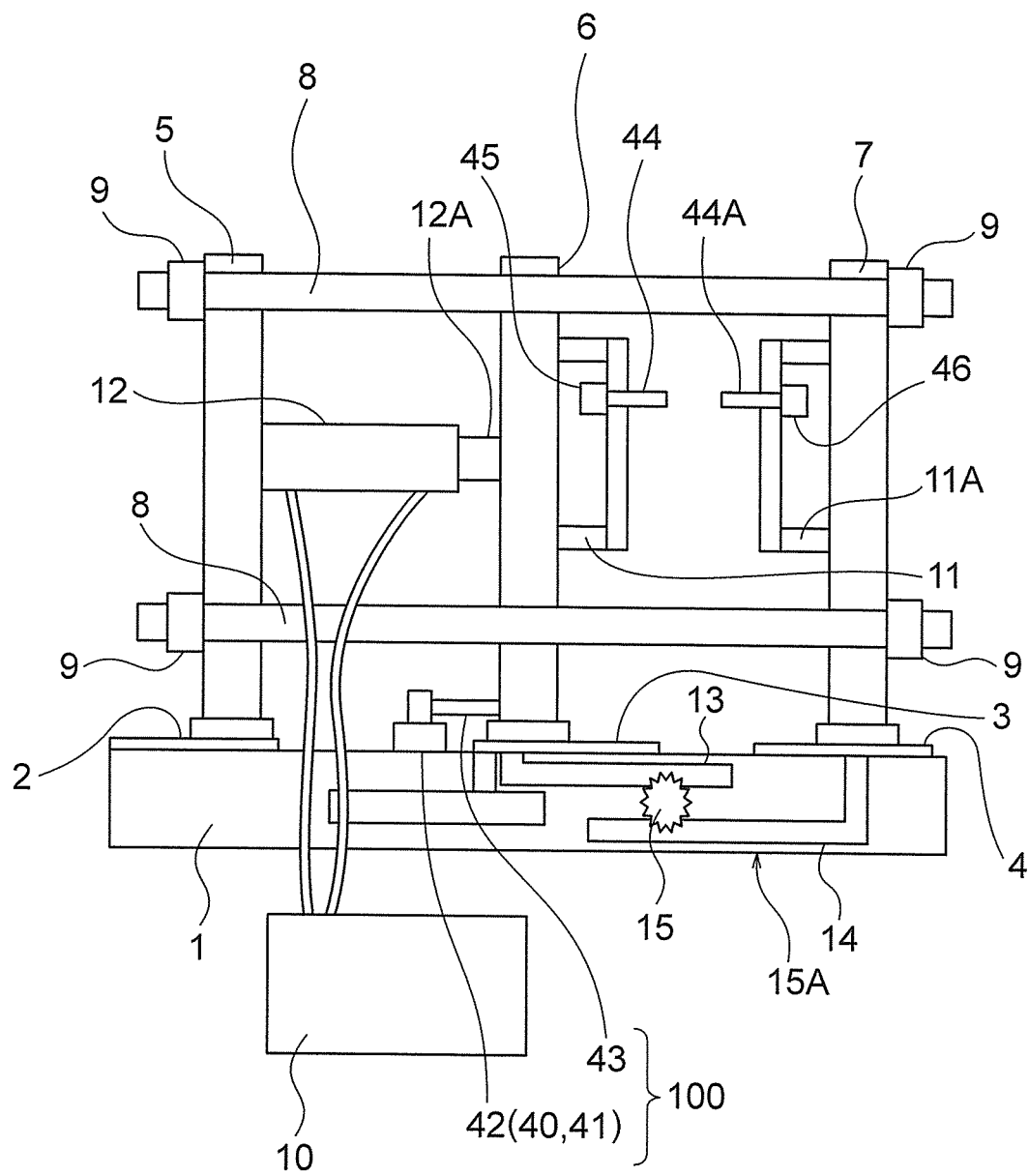
FIG. 2 is a schematic construction diagram showing the mold opening state of FIG. 1.

Further, in the construction of FIG. 2, the servomotors 45, 46 for the respective molds are operated to protrude the respective movable elements 44, 44A. From this state, both sides of the parison (not shown) are pressed in the way described above in FIG. 12, whereby concave portions can be formed on a molded article (not shown).

A state in which the operation of the actuator 12 is controlled by a hydraulic unit 10 like the construction of FIGS. 1 and 2 described above is shown in FIGS. 3 and 4.

That is, in the control construction of FIG. 3, a conventional hydraulic mold clamping device is so modified that a conventional analog linear-motion detector 16 is used, that the digital mold opening/closing position detection means 100 formed from the ball screw 43 and the servo motor 42 with the rotation detector having the rotation detector 40 according to this invention is added, and that the digital mold opening/closing position signal 100a from the servomotor 42 with the rotation detector is input to the control board 20.

In the construction of FIG. 3, the digital mold opening/closing position detection signal 100a from the servomotor 42 with the rotation detector can be obtained via the ball screw 43 as the platens 5, 6, 7 are opened/closed, and the operations of the servo motors 45, 46 for the respective molds can be controlled in synchronization with content thereof.

That is, the encoder 40 of the servo motor 42 operates as a high-speed position detector for opening/closing of the molds in a hydraulic mold clamping mechanism and converts position information on the platen 6 measured by the encoder 40 of the servo motor 42 into a speed during the opening/closing of the molds, so that the positions and the speeds of the servo motors 45, 46 in the molds 11, 11A are synchronized with each other during the opening/closing of the molds to enable the servo motors 45, 46 in the molds and other places to be synchronously operated by a programmable logic controller (PLC) in the control board 20.

Note that since the existing hydraulic mold clamping device is modified in the construction of FIG. 3, a mold opening/closing position detection signal 25 of the built-in analog linear-motion detector 16 is not used due to its slow communication speed.

Figure 4:
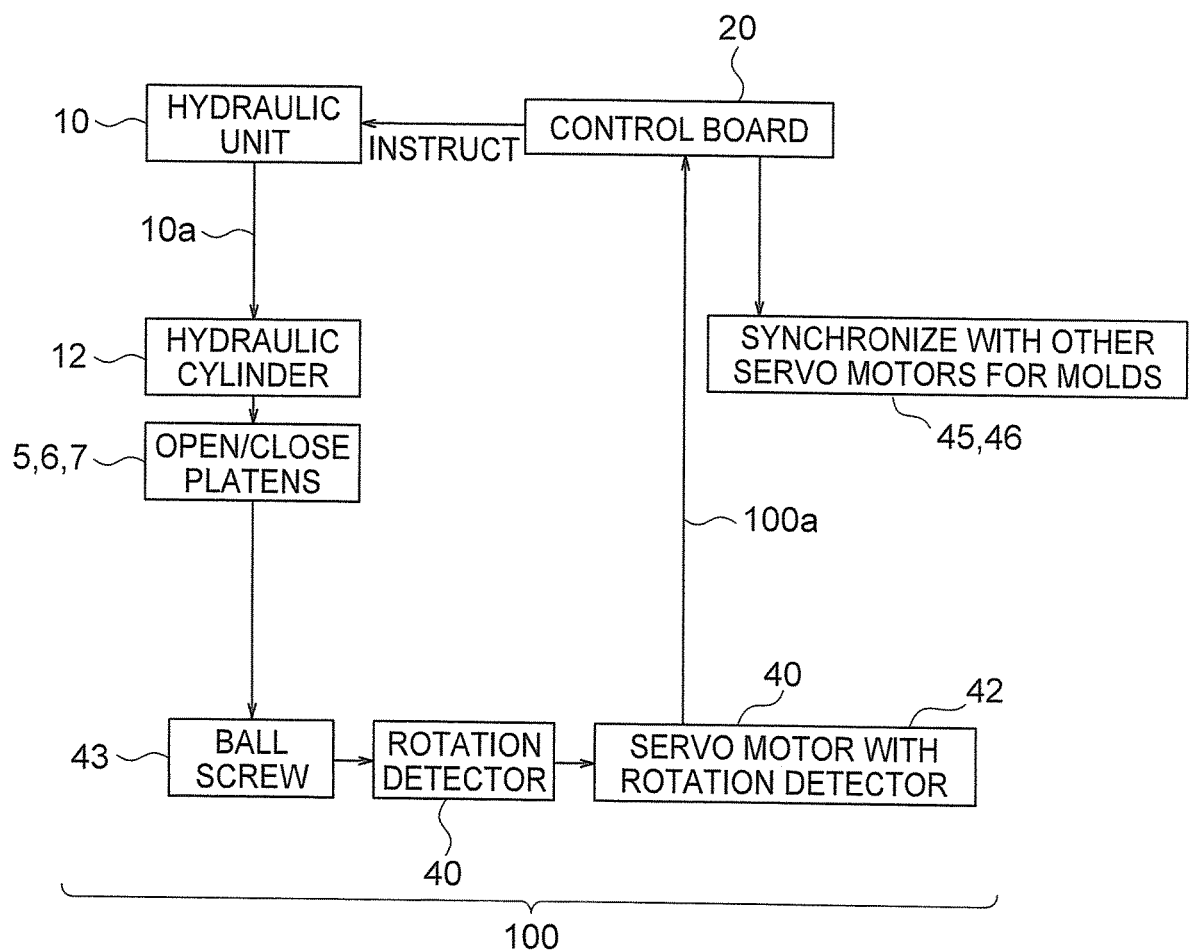
FIG. 4 is a block diagram in which the mold clamping device according to this invention is configured as a hydraulic type.

The construction of FIG. 4 is different from the modified type of FIG. 3 and is a construction in which only the digital mold opening/closing position detection means 100 formed from the ball screw 43 and the servo motor 42 with the rotation detector 40 according to this invention is used as a completely new type without using the analog linear-motion detector 16 to detect the position of the second platen 6 to enable the control of the synchronization between the second platen 6 and the servo motors 45, 46 for the respective molds.

Figure 5:
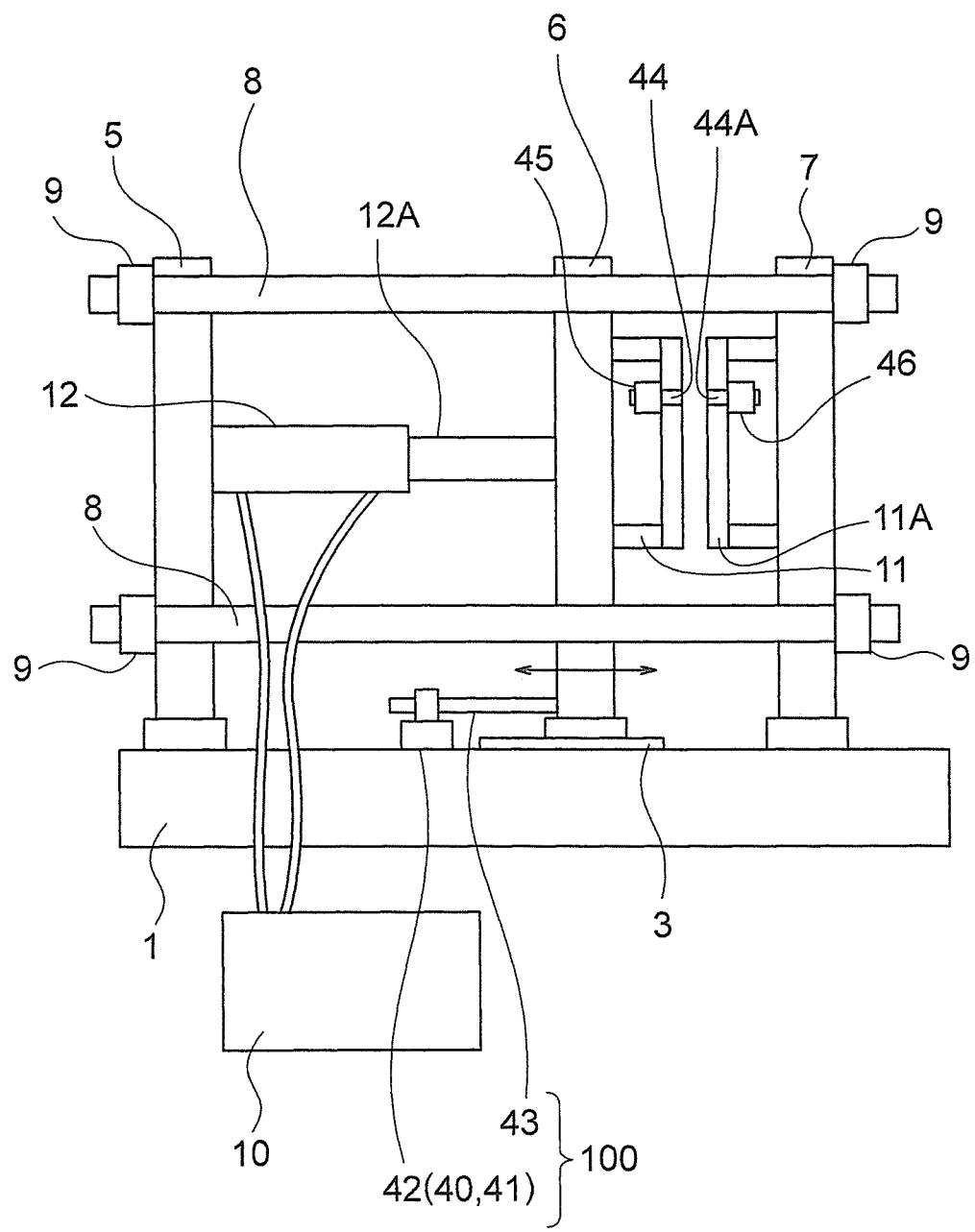
FIG. 5 is a schematic construction diagram showing the mold closing state of another embodiment of the mold clamping device according to this invention.
Figure 6:
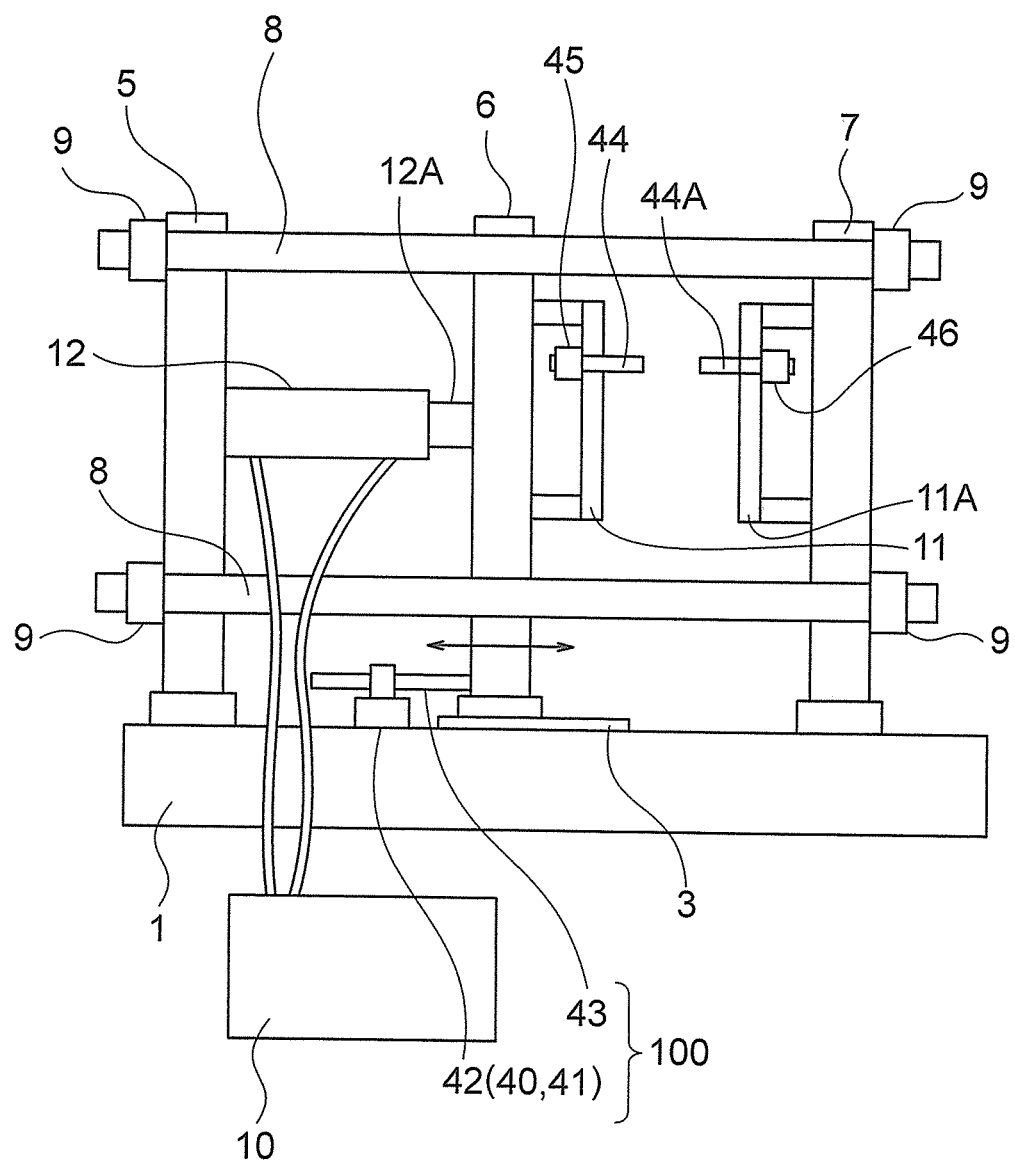
FIG. 6 is a schematic construction diagram showing the mold opening state of FIG. 5.
Figure 7:
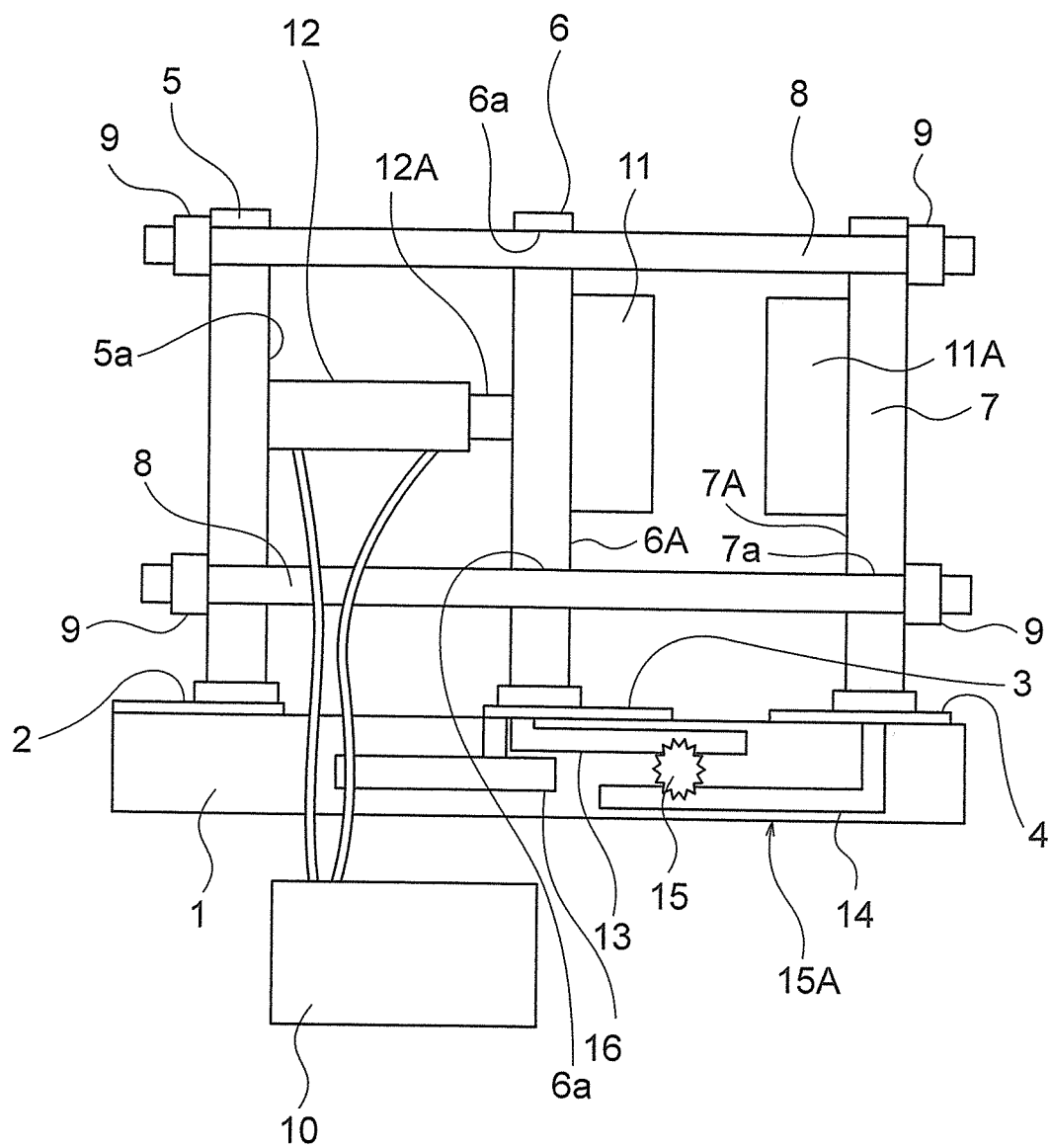
FIG. 7 is a schematic construction diagram showing the mold opening state of a conventional mold clamping device.
Figure 8:
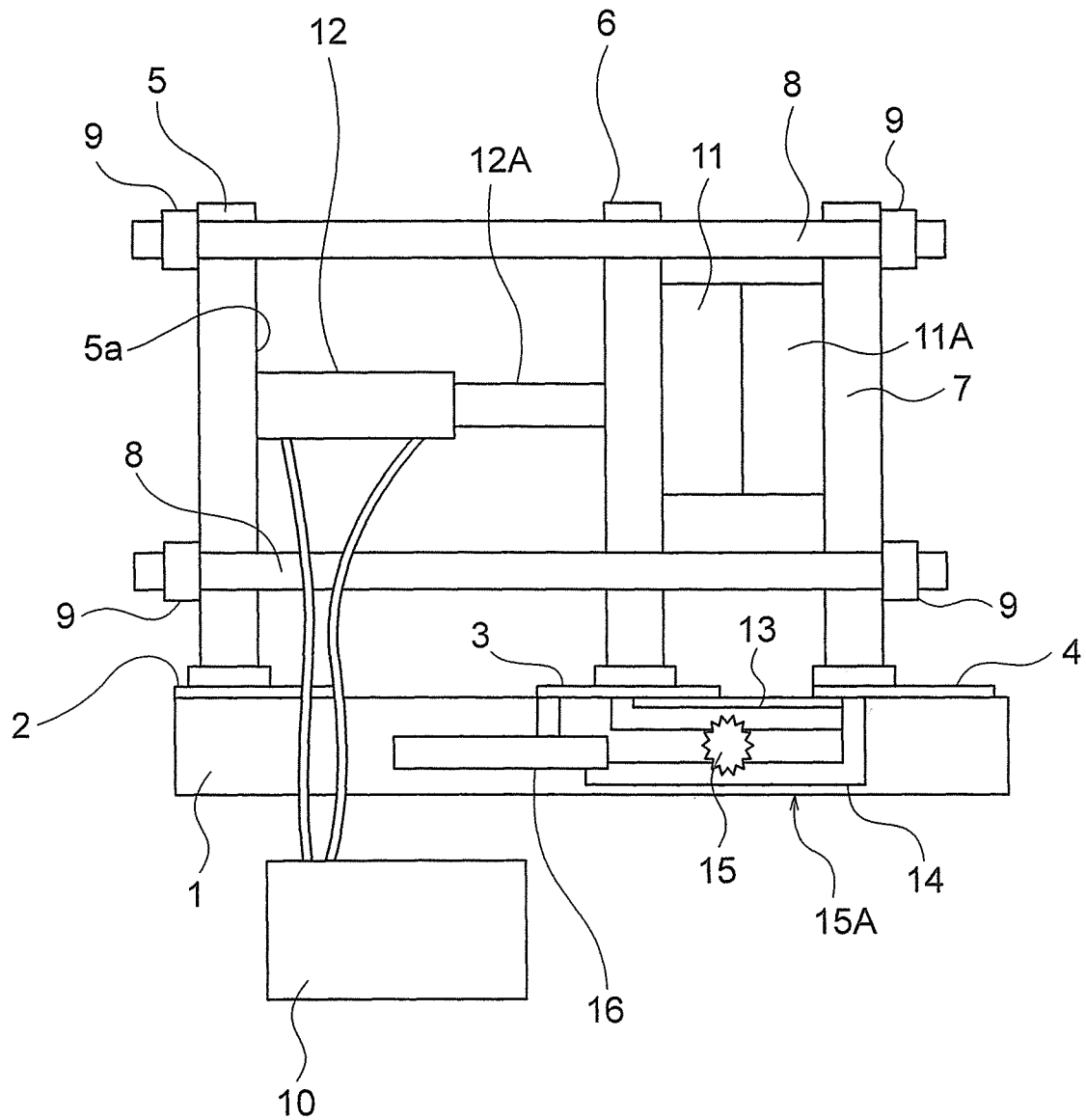
FIG. 8 is a schematic construction diagram showing the mold clamping state of FIG. 7.
Figure 9:
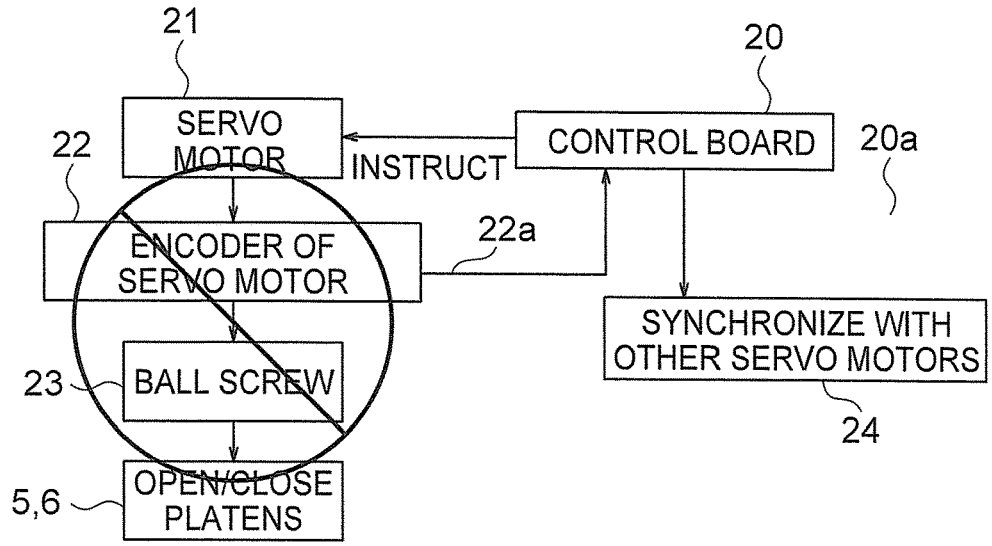
FIG. 9 is a block diagram showing a conventional electric mold clamping device.
Figure 10:
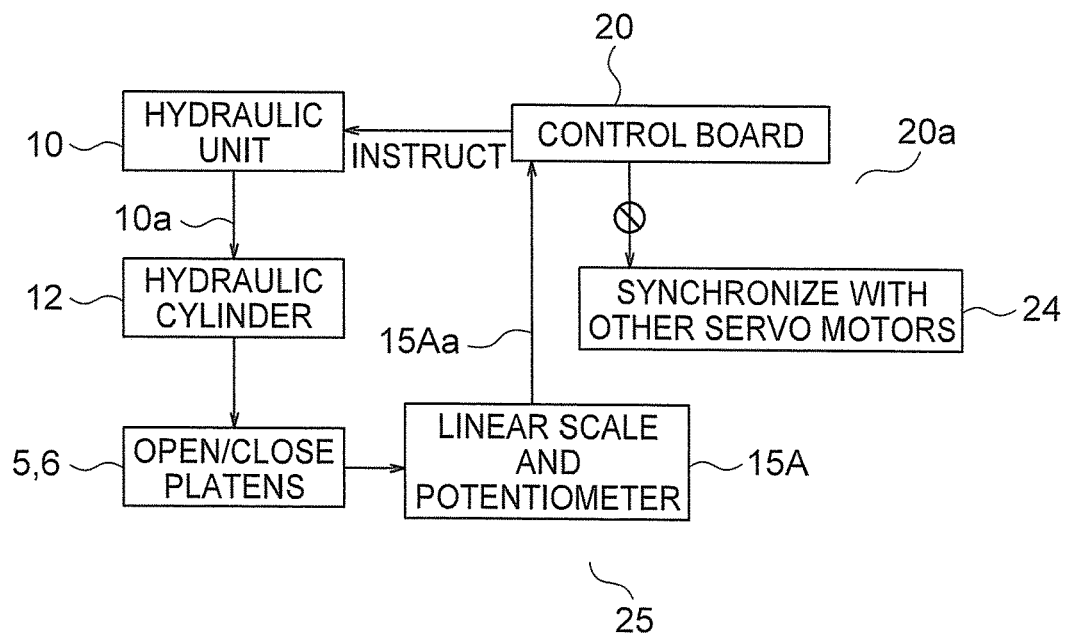
FIG. 10 is a block diagram showing a conventional hydraulic mold clamping device.

Next, FIGS. 5 and 6 show another embodiment of the mold clamping device according to this invention shown in FIGS. 1 and 2. Besides being applied to the construction of FIGS. 1 and 2 in which all the platens 5, 6, 7 are configured to move horizontally, this invention can also be applied to a mold clamping device in which first and third platens 5, 7 are fixed onto a base and only a second platen 6 moves horizontally, i.e., the second platen 6 is slid back and forth by a protrusion element 12A of an actuator 12.

Note that in the construction of FIGS. 5 and 6, portions same as those of FIGS. 1 and 2 described above are shown by the same reference signs to omit their descriptions, and only different portions are described.

Further, the construction of FIGS. 1 and 2 is slightly different from that of FIGS. 5 and 6, but their functions and effects are the same.

Further, the mold clamping device is disclosed as a hydraulic type in the state described above, but can also be applied to an electric type provided that a large motor having a torque corresponding to the hydraulic type is employed.

Next, the mold clamping device and the method according to this invention described above are summarized as follows.

That is, a mold clamping device that closes and opens first and second molds 11, 11A provided on at least a second platen 5, 6, 7 among first, second, and third platens provided on a base via a tie bar 8 includes: servo motor(s) for the molds provided in at least one or both of the respective molds; and digital mold opening/closing position detection means 100 provided on the base and detecting a mold position of the second platen 6, wherein one or both of the servo motors for the first and second molds are configured to be driven in synchronization with a digital opening/closing position signal 100a from the digital mold opening/closing position detection means 100. Further, the first and third platens 5, 7 are configured to move with the second platen 6.

Further, the digital mold opening/closing position detection means 100 is configured to be formed from a combination of any of an encoder, a resolver and a magnetic encoder, and a rack-and-pinion. Further, the mold clamping device according to any one of claims 1, 2, and 3 is configured to be combined with a blow molding machine.

Further, the digital mold opening/closing position detection means 100 is configured to be formed from a servo motor 42 with a rotation detector, and a ball screw 43.

Further, according to this invention, a mold clamping method for moving, with an actuator 12, at least a second platen 6 among first, second, and third platens provided on a base via a tie bar 8, and closing and opening first and second molds 11, 11A provided on the second and third platens 5, 7, respectively, includes: using servo motor(s) for the molds provided in at least one or both of the respective molds and digital mold opening/closing position detection means 100 provided on the base and detecting a mold position of the second platen 6; and driving one or both of the servo motors for the first and second molds in synchronization with a mold opening/closing position signal 100a from the digital mold opening/closing detection means 100.

In the mold clamping method, the first and third platens 5, 7 move with the second platen 6. Further, the mold clamping method according to any one of Claims 7, 8 and 9 is combined with a blow molding machine. Further, in the mold clamping method, the digital mold opening/closing position detection means 100 is formed from a servo motor 42 with a rotation detector, and a ball screw 43.

INDUSTRIAL APPLICABILITY

Regarding positions of platens upon mold clamping, a mold clamping device and a mold clamping method according to this invention synchronously drive servo motors for respective molds in the respective molds using a digital mold opening/closing position detection signal from digital mold opening/closing position detection means and synchronize the movements of the opening/closing of the molds and the respective molds with each other to enable easy molding of a large and complicated shape or the like.

Further, the mold clamping device may be retrofitted to an existing mold clamping device, and the performance of the mold clamping device can therefore be improved at lower cost than a case in which the mold clamping device is replaced by a new one.

REFERENCE SIGNS LIST

1 Base
2 First linear-motion guide
3 Second linear-motion guide
4 Third linear-motion guide
5 First platen
6 Second platen
7 Third platen
8 Tie bar
9 Nut
10 Hydraulic unit
11 First mold
11A Second mold
12 Actuator (such as hydraulic cylinder)
13 First lever
14 Second lever
15 Gear
15A Interlocking mechanism
16 Analog linear-motion detector
20 Control board
40 Rotation detector (such as encoder)
41 Servo motor
42 Servo motor with rotation detector
43 Ball screw
44 First movable element
44A Second movable element
45 Servo motor for first mold
46 Servo motor for second mold
100 Digital mold opening/closing position detection means
100a Digital mold opening/closing position detection signal

The invention claimed is:

1. A mold clamping device that moves, with an actuator, at least a second platen among first, second, and third platens provided on a base via a tie bar, and closes and opens first and second molds provided on the second and third platens, respectively, the mold clamping device comprising:
    servo motor(s) for the molds provided in at least one or both of the respective molds; and
    digital mold opening/closing position detection means provided on the base and detecting a mold position of the second platen, wherein
    one or both of the servo motors for the first and second molds are configured to be driven in synchronization with a digital mold opening/closing position signal from the digital mold opening/closing position detection means.

2. The mold clamping device according to claim 1, wherein the first and third platens are configured to move with the second platen.

3. The mold clamping device according to claim 1, wherein the digital mold opening/closing position detection means is formed from a combination of any of an encoder, a resolver and a magnetic encoder, and a rack-and-pinion.

4. The mold clamping device according to claim 1, wherein the mold clamping device is combined with a blow molding machine.

5. The mold clamping device according to claim 1, wherein the digital mold opening/closing position detection means is formed from a servo motor with a rotation detector, and a ball screw.

6. A mold clamping method for moving, with an actuator, at least a second platen among first, second, and third platens provided on a base via a tie bar, and closing and opening first and second molds provided on the second and third platens, respectively, the mold clamping method comprising:
    using servo motor(s) for the molds provided in at least one or both of the respective molds and digital mold opening/closing position detection means provided on the base and detecting a mold position of the second platen; and
    driving one or both of the servo motors for the first and second molds in synchronization with a digital mold opening/closing position signal from the digital mold opening/closing position detection means.

7. The mold clamping method according to claim 6, wherein the first and third platens move with the second platen.

8. The mold clamping method according to claim 6, wherein the digital mold opening/closing position detection means is formed from a combination of any of an encoder, a resolver and a magnetic encoder and a rack-and-pinion.

9. The mold clamping method according to claim 6, wherein the mold clamping method is combined with a blow molding machine.

10. The mold clamping method according to claim 6, wherein the digital mold opening/closing position detection means is formed from a servo motor with a rotation detector, and a ball screw.

* * * * *